T. J. Close,
Settee,
N° 80,528.  Patented July 28, 1868.

Witnesses;
G. A. Smith
W. L. DuBois

Inventor,
Thos. J. Close
By J. C. Freak
his attorney

United States Patent Office.

THOMAS J. CLOSE, OF PHILADELPHIA, PENNSYLVANIA.

Letters Patent No. 80,528, dated July 28, 1868.

IMPROVED SETTEE.

*The Schedule referred to in these Letters Patent and making part of the same.*

TO ALL WHOM IT MAY CONCERN:

Be it known that I, THOMAS J. CLOSE, of Philadelphia, in the county of Philadelphia, and State of Pennsylvania, have invented a new and useful Improvement in Settees; and I do hereby declare that the following is a full, clear, and exact description thereof, reference being had to the accompanying drawing.

To enable those skilled in the art to make and use my invention, I will proceed to describe its construction.

The nature of my invention consists in a peculiar arrangement for securing the slats of a settee to the frame, by which arrangement the expense of screws, drilling and countersinking for the same, is saved; also, that it can be set up with greater facility, and is much more durable.

Figure 1:
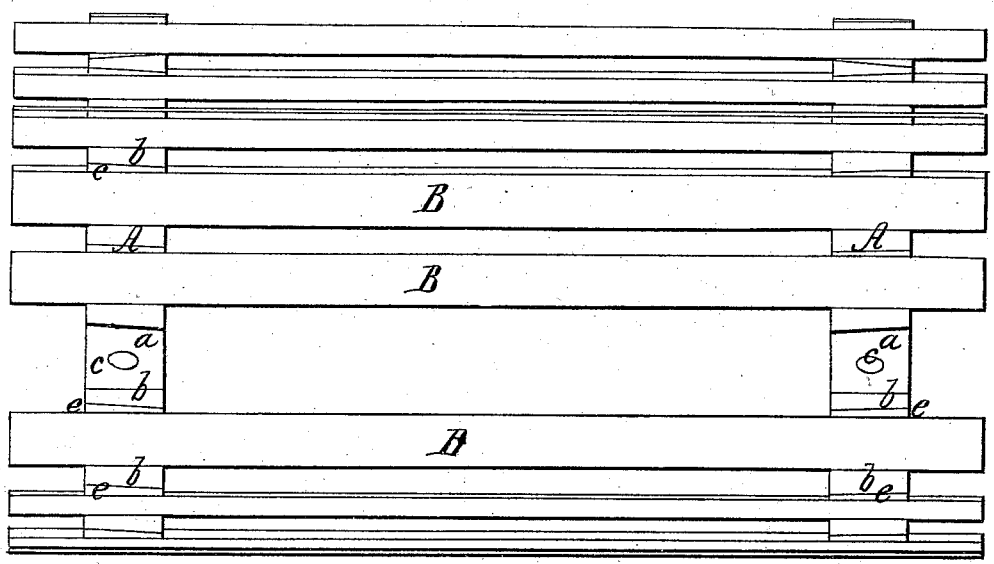
Figure 1 is a plan view.
Figure 3:
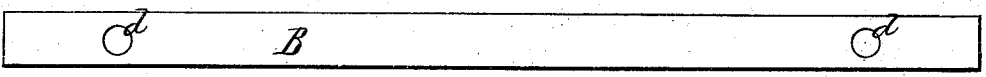
Figure 3 is a bottom view of one of the slats.
Figure 4:
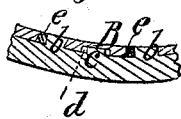
Figure 4 is a section of a portion of the frame, and one of the slats and keys.
Figure 2:
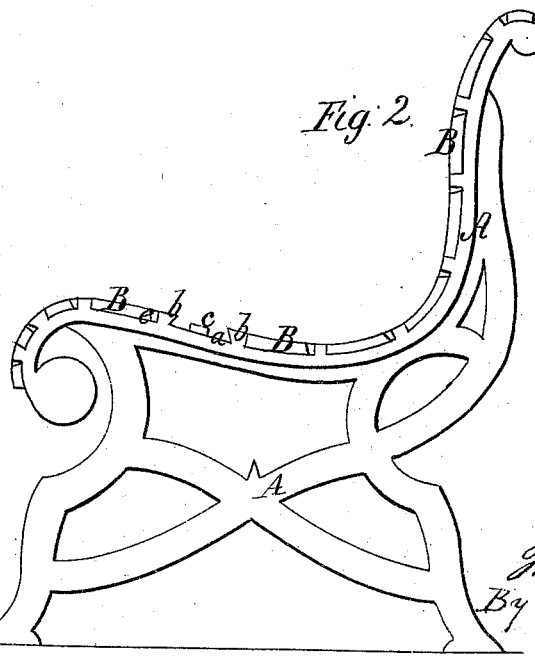
Figure 2 is an end elevation.

Its construction is as follows: On the upper or outer side of the frame A are dove-tail mortises, $a$, seen in figs. 1 and 2, one side of each mortise being cut oblique, and leaving between each one a lug, $b$. At or near the centre of each mortise is an oval boss, $c$, rising above the bottom of the mortise, about one-half of the height of the lug $b$. On the under side of the slats B are circular countersinks, $d$, which fit over the bosses $c$ $c$. It will be seen that the bosses are oval and the countersinks circular, which will allow of play in but one direction. After the slat has been placed in proper position, a wedge-shaped key, $e$, is driven between one side of the slat B and the lug $b$, (as seen in the drawing,) which holds the slat firmly to the frame A.

What I claim as my invention, and desire to secure by Letters Patent, is—

1. A frame of a settee, with dove-tail mortises and round or oval bosses, substantially in the manner and for the purpose specified.

2. The combination of the slats B, having holes or countersinks, with the bosses $c$, as described, on the frame A, and wedge-shaped keys $e$, substantially in the manner and for the purposes set forth.

THOS. J. CLOSE.

Witnesses:
HERMAN BAMBERGER,
WM. G. RUSSELL.